US012571744B2

(12) United States Patent
Koch et al.

(10) Patent No.: US 12,571,744 B2
(45) Date of Patent: Mar. 10, 2026

(54) HARDWARE FOR AUTOMATION OF COMPUTER TOMOGRAPHY SAMPLE CHANGING

(71) Applicant: Raytheon Technologies Corporation, Farmington, CT (US)

(72) Inventors: Robert Koch, Hartford, CT (US); Christopher James Pelliccione, Tolland, CT (US); Elliot Hyde, Vernon, CT (US)

(73) Assignee: RTX Corporation, Farmington, CT (US)

( * ) Notice: Subject to any disclaimer, the term of this patent is extended or adjusted under 35 U.S.C. 154(b) by 315 days.

(21) Appl. No.: 18/216,072

(22) Filed: Jun. 29, 2023

(65) Prior Publication Data

US 2025/0003894 A1 Jan. 2, 2025

(51) Int. Cl.
*G01N 23/046* (2018.01)

(52) U.S. Cl.
CPC ... *G01N 23/046* (2013.01); *G01N 2223/1016* (2013.01); *G01N 2223/307* (2013.01); *G01N 2223/321* (2013.01); *G01N 2223/419* (2013.01); *G01N 2223/63* (2013.01); *G01N 2223/64* (2013.01); *G01N 2223/645* (2013.01); *G01N 2223/646* (2013.01)

(58) Field of Classification Search
None
See application file for complete search history.

(56) References Cited

U.S. PATENT DOCUMENTS

| | | | |
|---|---|---|---|
| 3,920,151 | A | 11/1975 | Roe |
| 4,803,639 | A | 2/1989 | Steele et al. |
| 6,111,930 | A | 8/2000 | Schipper |
| 6,457,862 | B1 | 10/2002 | Sumii et al. |

(Continued)

FOREIGN PATENT DOCUMENTS

| | | | | |
|---|---|---|---|---|
| CN | 114544677 A | | 5/2022 | |
| CN | 116297589 A | * | 6/2023 | ........... G01N 23/207 |

(Continued)

OTHER PUBLICATIONS

Extended European Search Report for EP Counterpart Application No. 24184407.5 dated Oct. 25, 2024.

*Primary Examiner* — Thomas R Artman
(74) *Attorney, Agent, or Firm* — Bachman & LaPointe, P.C.

(57) ABSTRACT

An X-ray tomography sample changing hardware including a support bracket configured to attach to an X-ray tomography support; a mounting arm attached to the support bracket, the mounting arm having a beam, at least one slot formed in the beam, the at least one slot including a mouth configured to receive a sample stage; the sample stage including a body having an axis with an upper portion and a lower portion axially opposite the upper portion; the lower portion configured to mate with a receiver on a sample manipulator for an X-ray tomography machine; and multiple chambers formed in the body and aligned axially between the upper portion and the lower portion, each of the multiple chambers including a mounting feature configured to support a part within each of the multiple chambers.

19 Claims, 12 Drawing Sheets

(56)                 References Cited

U.S. PATENT DOCUMENTS

| | | | | |
|---|---|---|---|---|
| 7,177,388 | B2 * | 2/2007 | Takagi ................. | G01N 23/046 |
| | | | | 378/20 |
| 7,627,083 | B2 | 12/2009 | Ross et al. | |
| 10,416,096 | B2 * | 9/2019 | Freeman .............. | G01N 23/043 |
| 10,803,574 | B2 * | 10/2020 | Kirschenman ....... | G01N 23/046 |
| 11,714,054 | B2 * | 8/2023 | Kirschenman ....... | G01N 23/046 |
| | | | | 378/58 |
| 12,007,339 | B2 * | 6/2024 | Case ...................... | G01N 23/04 |
| 2006/0133565 | A1 * | 6/2006 | Takagi ................. | G01N 23/046 |
| | | | | 378/20 |
| 2008/0226028 | A1 * | 9/2008 | Ross ...................... | G01N 23/04 |
| | | | | 378/58 |
| 2016/0334344 | A1 * | 11/2016 | Freeman .................. | F01D 5/12 |
| 2017/0023495 | A1 * | 1/2017 | Santillan .............. | G01N 23/046 |
| 2018/0189944 | A1 * | 7/2018 | Kirschenman ....... | G01N 23/223 |
| 2020/0408705 | A1 * | 12/2020 | Kirschenman ....... | G01N 23/223 |
| 2021/0404977 | A1 * | 12/2021 | Case ...................... | G01N 23/04 |
| 2024/0151662 | A1 * | 5/2024 | Belassel .............. | G01N 23/207 |
| 2025/0003894 | A1 * | 1/2025 | Koch ................... | G01N 23/046 |

FOREIGN PATENT DOCUMENTS

| | | | | | |
|---|---|---|---|---|---|
| DE | 202013003922 | U1 * | 5/2013 | .......... | G01N 23/046 |
| DE | 102020201801 | A1 * | 10/2020 | .......... | G01B 5/0004 |
| JP | 2005221460 | A | 8/2005 | | |
| PT | 115889 | B * | 3/2022 | .......... | G01N 23/046 |
| WO | 2020190919 | A1 | 9/2020 | | |

* cited by examiner

HARDWARE FOR AUTOMATION OF COMPUTER TOMOGRAPHY SAMPLE CHANGING

BACKGROUND

The present disclosure is directed to X-ray tomography sample changing hardware.

Current X-ray tomography equipment such as a Nikon brand micro X-ray computed tomography system is configured to scan a large number (greater than 100) uniformly shaped small samples. The current X-ray tomography equipment is intended for sample changing high throughput of physically small uniformly shaped geometry parts, with little flexibility or modularity and cannot accommodate vertical stacking of samples.

During second shift and third shift working hours technicians are less available. Thus, automated X-ray tomography with reduced staff availability is typical for the second and third shift working hours. The current X-ray tomography equipment faces challenges when being used to scan larger parts spanning a wide variety of physical shapes. Sample changing capacity is limited. These parts tend to have a lower sample count (10-100). The X-ray tomography equipment can sit idle during the second and third shift hours, leaving valuable resources under-utilized.

What is needed is an X-ray tomography hardware that allows for greater breadth and flexibility in part geometry for use in off-hours unattended overnight and weekend utilization of currently existing tomography equipment.

SUMMARY

In accordance with the present disclosure, there is provided an X-ray tomography sample changing hardware comprising: a support bracket configured to attach to an X-ray tomography support; a mounting arm attached to the support bracket, the mounting arm having a beam, at least one slot formed in the beam, the at least one slot including a mouth configured to receive a sample stage; the sample stage including a body having an axis with an upper portion and a lower portion axially opposite the upper portion; the lower portion configured to mate with a receiver on a sample manipulator for an X-ray tomography machine; and multiple chambers formed in the body and aligned axially between the upper portion and the lower portion, each of the multiple chambers including a mounting feature configured to support a part within each of the multiple chambers.

A further embodiment of any of the foregoing embodiments may additionally and/or alternatively include that the body of the sample stage includes walls formed in the body; the walls supporting shelves defining each of the multiple chambers.

A further embodiment of any of the foregoing embodiments may additionally and/or alternatively include that the at least one slot is arrayed along the beam of the mounting arm in a spaced apart fashion configured to allow for space between the sample stages supported on the mounting arm.

A further embodiment of any of the foregoing embodiments may additionally and/or alternatively include that the multiple sample chambers are oriented axially and configured for vertical stacking of each part in the sample stage.

A further embodiment of any of the foregoing embodiments may additionally and/or alternatively include that the lower portion of the sample stage includes dual flanges extending radially from a shaft formed in the body proximate the lower portion, the shaft including a diameter sized to be insertable into/removeable from the mouth of the slot, the dual flanges being sized larger than the mouth of the slot configured to nest in a concave surface of the slot.

A further embodiment of any of the foregoing embodiments may additionally and/or alternatively include that the lower portion includes a coupling configured to mate with the receiver of the sample manipulator.

A further embodiment of any of the foregoing embodiments may additionally and/or alternatively include that the mounting feature is selected from the group consisting of slots, grooves, notches, hollows, pins, hooks, latches, and the like.

In accordance with the present disclosure, there is provided an X-ray tomography sample changing hardware comprising: an X-ray scanner proximate a scanner support; a sample manipulator in operative communication with the X-ray scanner; the sample manipulator including a receiver mounted on a turntable secured to a sled mounted on a table; a support bracket configured to attach to the scanner support; mounting arm attached to the support bracket, the mounting arm having a beam, at least one slot formed in the beam, the at least one slot including a mouth configured to receive a sample stage; the sample stage including a body having an axis with an upper portion and a lower portion axially opposite the upper portion; the lower portion configured to mate with the receiver on the sample manipulator; and multiple chambers formed in the body and aligned axially between the upper portion and the lower portion, each of the multiple chambers including a mounting feature configured to support a part within each of the multiple chambers.

A further embodiment of any of the foregoing embodiments may additionally and/or alternatively include that the mounting feature is selected from the group consisting of slots, grooves, notches, hollows, pins, hooks, latches, and the like.

A further embodiment of any of the foregoing embodiments may additionally and/or alternatively include that the lower portion includes a coupling configured to mate with the receiver of the sample manipulator.

A further embodiment of any of the foregoing embodiments may additionally and/or alternatively include that the lower portion of the sample stage includes at least one flange extending radially from a shaft formed in the body proximate the lower portion, the shaft including a diameter sized to be insertable into/removable from the mouth of the slot, the at least one flange being sized larger than the mouth of the slot configured to nest in a concave surface of the slot.

A further embodiment of any of the foregoing embodiments may additionally and/or alternatively include that the body of the sample stage includes a wall formed in the body; the wall supporting shelves defining each of the multiple chambers.

A further embodiment of any of the foregoing embodiments may additionally and/or alternatively include that the multiple sample chambers are oriented axially and configured for vertical stacking of each part in the sample stage.

In accordance with the present disclosure, there is provided a process for supporting a part in an X-ray tomography sample changing hardware comprising attaching a support bracket an X-ray tomography scanner support; attaching a mounting arm to the support bracket, the mounting arm having a beam, at least one slot formed in the beam, the at least one slot including a mouth configured to receive a sample stage; the sample stage including a body having an axis with an upper portion and a lower portion axially opposite the upper portion; mating the lower portion with a receiver on a sample manipulator for an X-ray tomography machine; forming multiple chambers in the body; and aligning the multiple chambers axially between the upper portion and the lower portion.

A further embodiment of any of the foregoing embodiments may additionally and/or alternatively include that the process further comprising supporting a part within at least one of the multiple chambers employing a mounting feature.

A further embodiment of any of the foregoing embodiments may additionally and/or alternatively include that the body of the sample stage includes walls formed in the body; and defining each of the multiple chambers by employing shelves formed between the walls.

A further embodiment of any of the foregoing embodiments may additionally and/or alternatively include that the process further comprising orienting the multiple sample chambers axially; and configuring the multiple chambers for vertical stacking of each part in the sample stage.

A further embodiment of any of the foregoing embodiments may additionally and/or alternatively include that the process further comprising forming the mounting feature to accept a variety of part geometries, wherein the mounting feature is selected from the group consisting of slots, grooves, notches, hollows, pins, hooks, latches, and the like.

A further embodiment of any of the foregoing embodiments may additionally and/or alternatively include that the process further comprising extending at least one flange radially from a shaft formed in the body proximate the lower portion, the shaft including a diameter sized to be insertable into/removeable from the mouth of the slot, the at least one flange being sized larger than the mouth of the slot configured to nest in a concave surface of the slot.

A further embodiment of any of the foregoing embodiments may additionally and/or alternatively include that the process further comprising forming a coupling in the lower portion; the coupling configured to mate with the receiver of the sample manipulator.

Other details of the X-ray tomography sample changing hardware are set forth in the following detailed description and the accompanying drawings wherein like reference numerals depict like elements.

DETAILED DESCRIPTION

Figure 1:
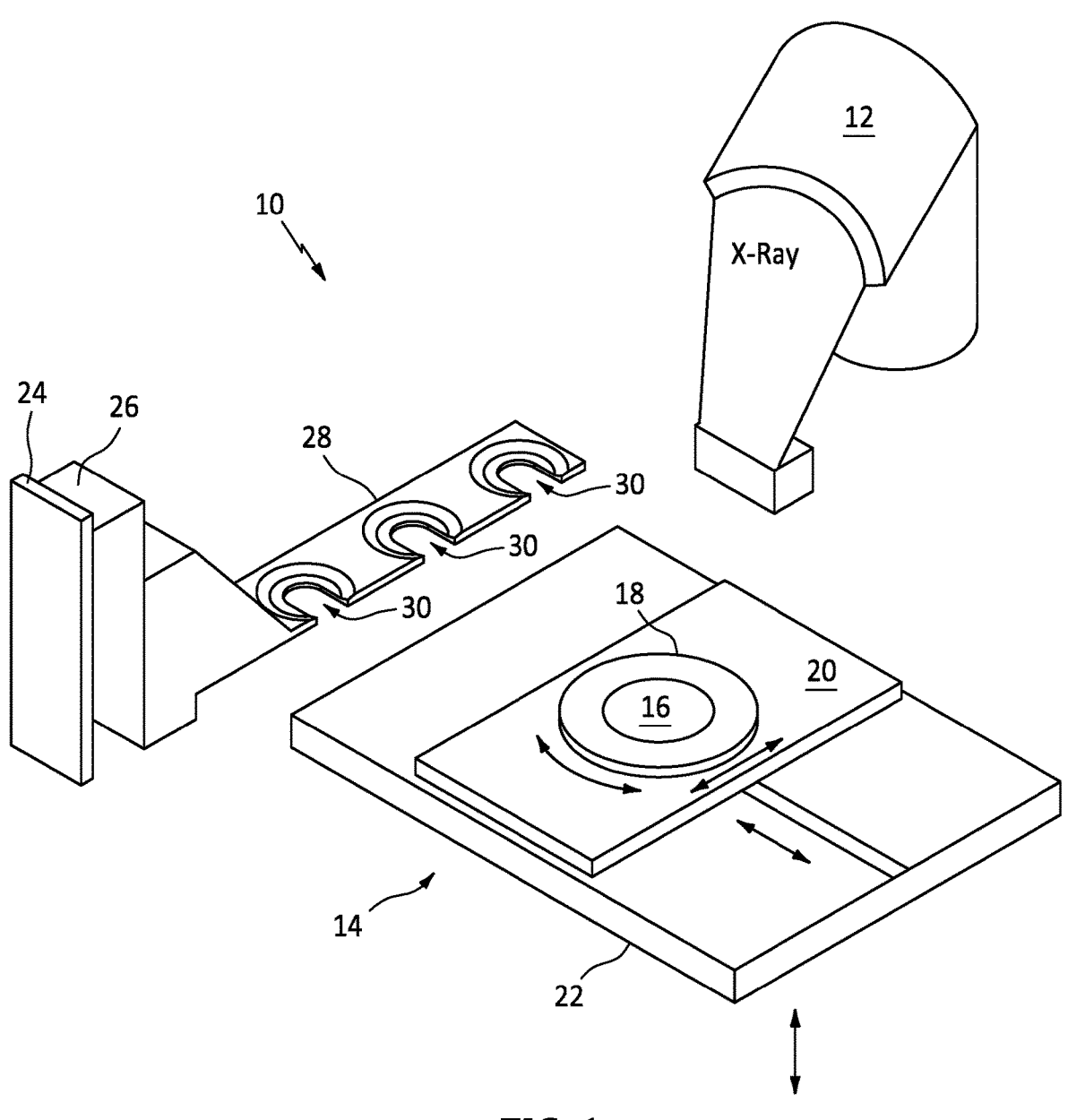
FIG. 1 is a schematic representation of an exemplary X-ray tomography system.
Figure 2:
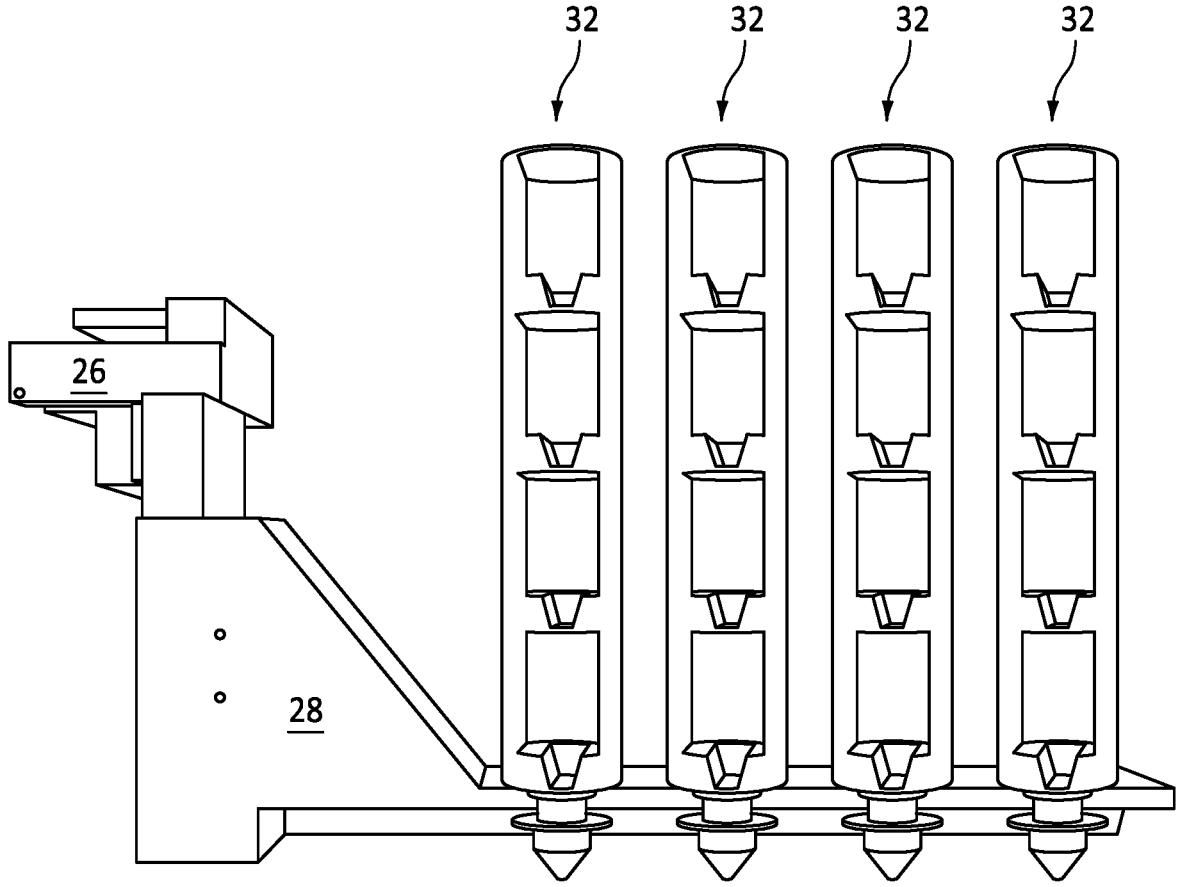
FIG. 2 is a schematic representation of X-ray tomography sample changing hardware.

Referring now to FIG. 1 and FIG. 2, there is illustrated an X-ray tomography system 10. The tomography system 10 can includes an X-ray scanner 12. The X-ray scanner produces the necessary radiation and imaging capacity in the system 10. A sample manipulator 14 includes a multi-dimensional motion manipulation system configured to fetch samples and present the samples to the scanner 12 for imaging.

The sample manipulator 14 includes a receiver 16 mounted on a turntable 18. The turntable 18 is mounted on a sled 20 that can translate the turntable 18 laterally in multiple directions. The sled 20 is mounted on a table 22 that can travel vertically relative to the scanner 12.

A scanner support 24 provides structural stability to a support bracket 26. The support bracket 26 attaches to a mounting arm 28. The mounting arm 28 includes slots 30 configured to accept sample stages 32. The slots 30 can be C-shaped slots 30.

The sample manipulator 14 is configured to locate the receiver 16 into a position beneath each of the sample stages 32 located on the mounting arm 28 in the C-shaped slots 30. The sample manipulator 14 can retrieve the sample stage 32 and transport the sample stage 32 to a location in front of the X-ray scanner 12. The sample manipulator 14 can rotate the sample stage 32 about the turntable 18 allowing for complete scanning on all sides o of the sample stage 32. The sample manipulator 14 can then return the sample stage 32 back to the empty C-shaped slot 30 on the mounting arm 28. The sample manipulator 14 can repeat the process for each of the sample stages 32 mounted to the mounting arm 28.

Figure 3:
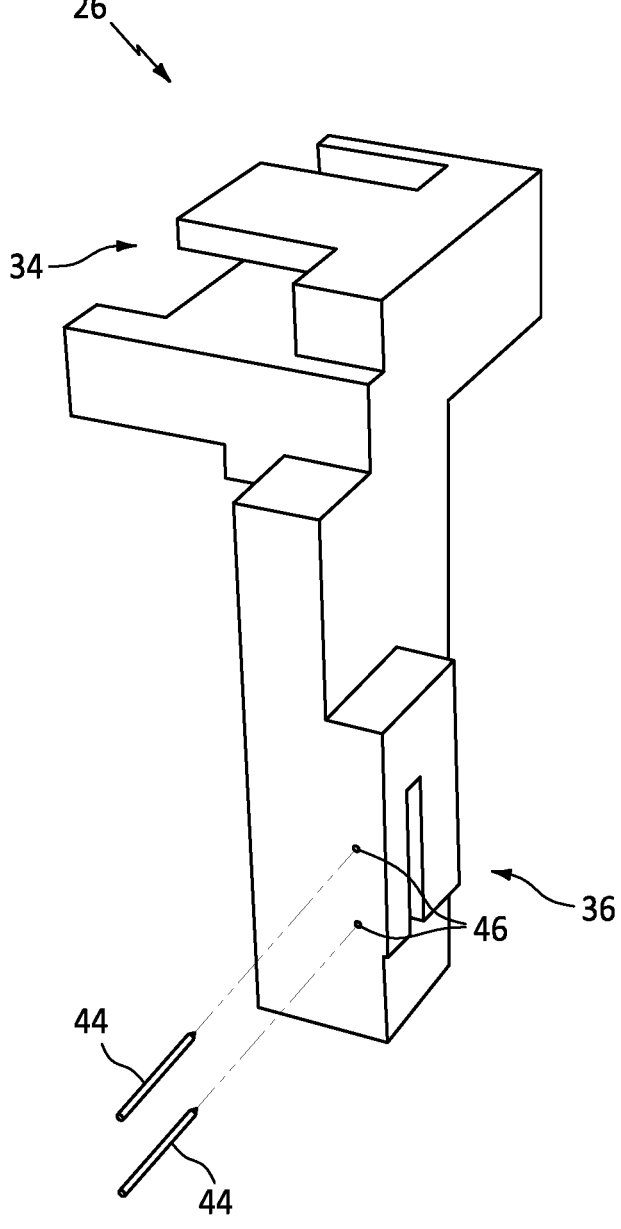
FIG. 3 is a schematic representation of an exemplary support bracket.

Referring also to FIG. 3 details of the exemplary support bracket 26 are shown. The support bracket 26 is configured to mount to existing X-ray tomography supports 24. The support bracket 26 allows for interchangeable capability from different brands of X-ray tomography equipment. The support bracket 26 can include an attachment feature 34 adapted to a particular support 24. The support bracket 26 includes a support bracket receiver 36 that is adapted to receive the mounting arm 28.

Figure 4:
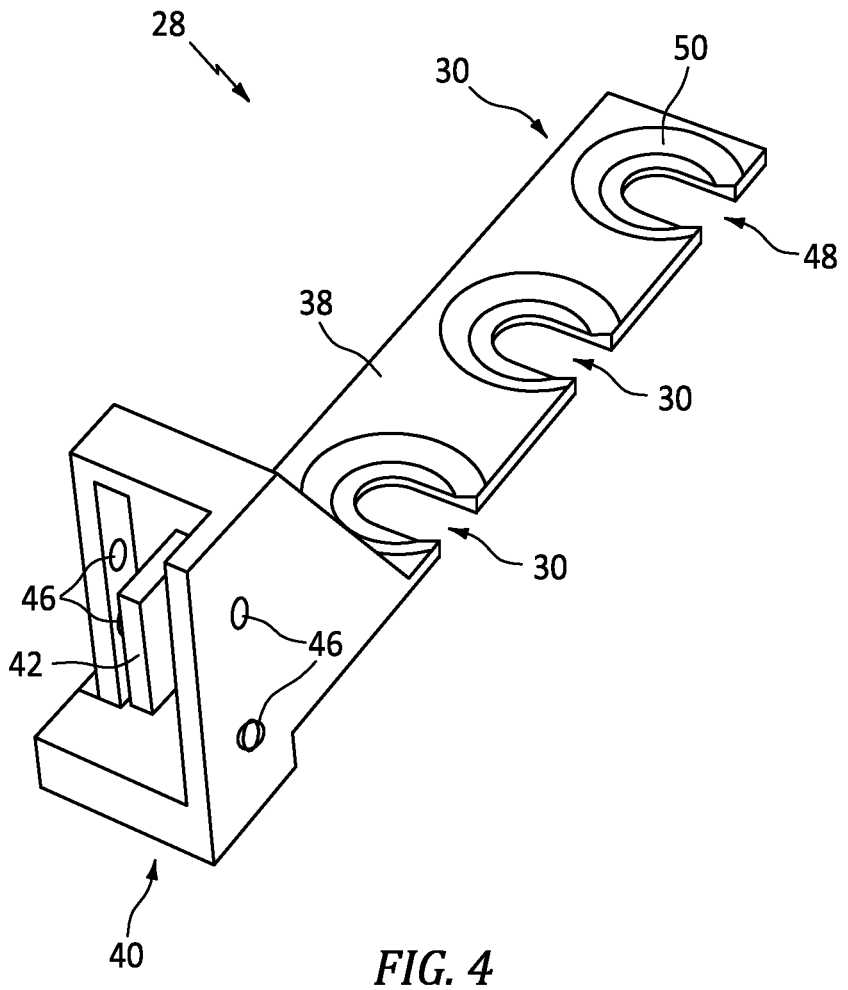
FIG. 4 is a schematic representation of an exemplary mounting arm.
Figure 5:
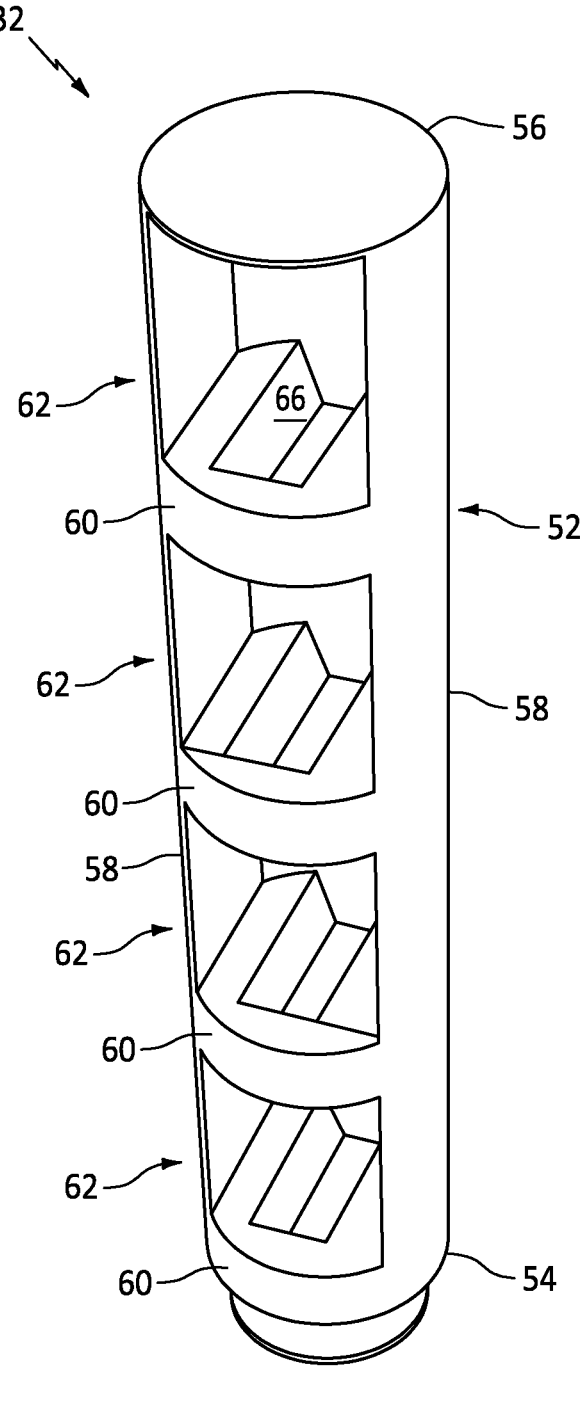
FIG. 5 is a rear isometric view schematic representation of an exemplary sample stage.
Figure 6:
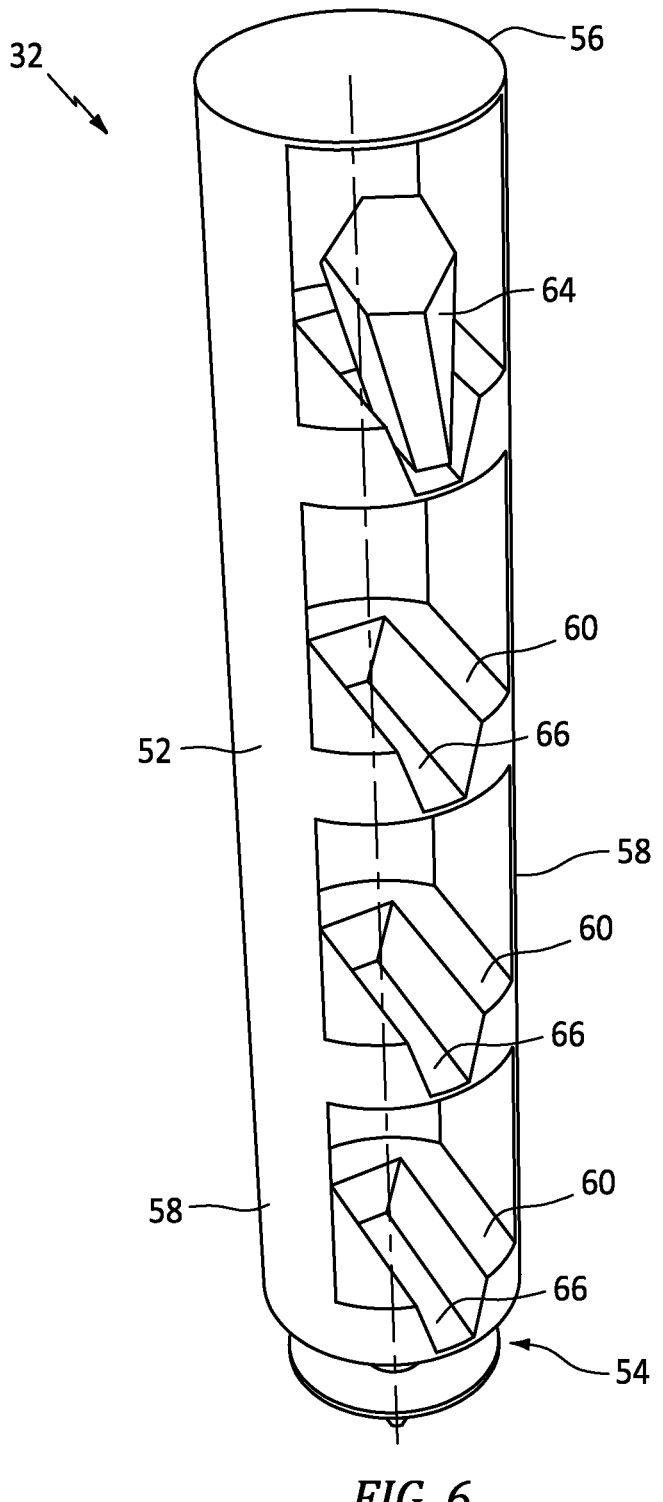
FIG. 6 is a front isometric view schematic representation of an exemplary sample stage.

Referring to FIG. 4 details of the exemplary mounting arm 28 are shown. The mounting arm 28 includes a beam 38 having a coupling end 40. The coupling end 40 includes a tab portion 42 that is configured to mate with the support bracket receiver 36 to secure the mounting arm 28 to the support bracket 26. A set of pins 44 are insertable through pin apertures 46 to secure the mounting arm 28 with the support bracket 26. The C-shaped slot(s) 30 can be arrayed along the beam 38 of the mounting arm 28 in a spaced apart fashion to allow for ample spacing between the sample stages 32. Each C-shaped slot 30 includes a mouth 48 that allows for the sample stage 32 to enter into/exit from the C-shaped slot 30. The C-shaped slot 30 includes a concave surface 50 that nests the sample stage 32 within the C-shaped slot 30. The figures depict 3 C-shaped slots 30, however it is contemplated that multiple C-shaped slots 30 can be employed. The mounting arm 28 provides a rigid structure that locates the C-shaped slots 30 at fixed coordinates to facilitate the sample manipulator 14 being able to locate the sample stages 32 accurately for retrieval during an automated scanning procedure.

Referring also to FIG. 5 through FIG. 8 details of an exemplary sample stage 32 are shown. The sample stage 32

Figure 7:
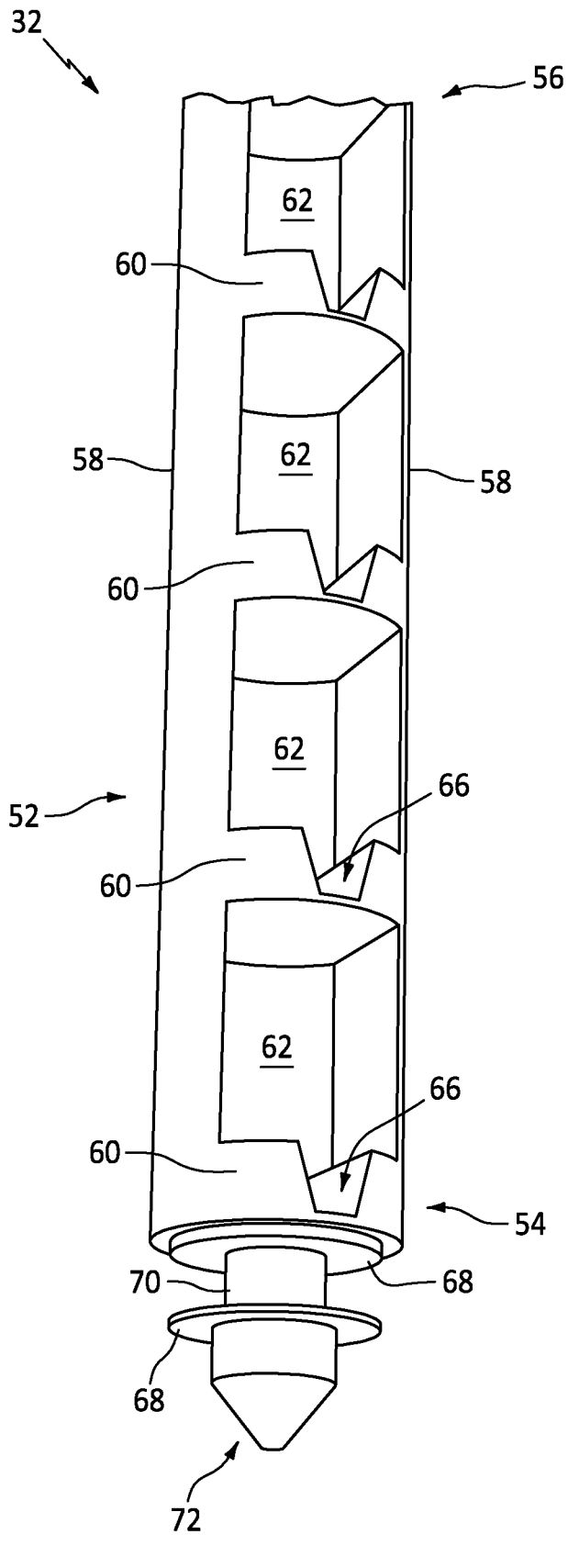
FIG. 7 is a front isometric view schematic representation of an exemplary sample stage.
Figure 8:
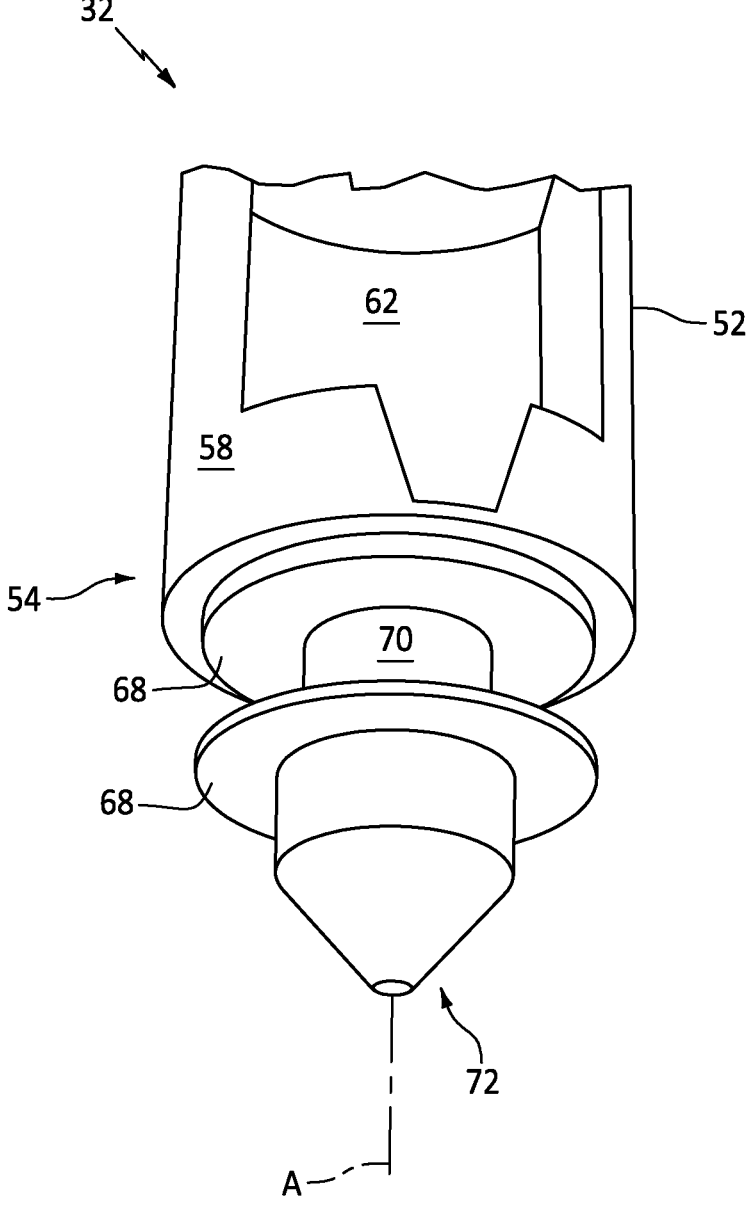
FIG. 8 is a front isometric view schematic representation of an exemplary sample stage lower section.

5 includes a body 52 having a lower portion 54 and an upper portion 56 opposite the lower portion 54. Walls 58 support shelves 60. The shelves 60 and walls 58 define a sample chamber 62 configured to receive the sample part 64 to be scanned as seen in FIG. 7. The sample chamber 62 can be sized to allow for particular parts 64 to be placed into the sample chamber 62 and secured to the shelf 60. In an exemplary embodiment, as shown, the shelves 60 include mounting features 66 configured to secure a portion of the part 64 within the chamber 62. The mounting features 66 can be slots, grooves, notches, hollows, pins, hooks, latches, and the like. The mounting feature 66 can be customized to receive a particular style of part 64, such as a fir tree portion of a root on a turbine blade.

The sample chambers 62 are oriented axially (vertically) and allow for vertical stacking of the parts 64 in the sample stage 32. The vertical stacking configuration allows for maximizing the space available above the mounting arm 28. The axis A (FIG. 8) provides relative relationships to the body 52. In this embodiment, the vertical orientation of the chambers 62 are along the axis A, that is axially. A radial direction is orthogonal to the axis A.

The lower portion 54 of the sample stage 32 includes dual flanges 68 extending radially from a shaft 70. The shaft 70 is oriented axially and is cylindrical in shape. The dual flanges 68 are similarly circular shaped and extend radially from the shaft 70. The shaft 70 and dual flanges 68 form a shape that matches the C-shaped slot 30. The shaft 70 has a diameter sized to be insertable into/removeable from the mouth 48 of the C-shaped slot 30. The dual flanges 68 are sized larger than the mouth 48 of the C-shaped slot 30 and configured to nest in the concave surface 50 of the C-shaped slot 30. The dual flanges 68 provide support and stability to the sample stage 32 when mounted within the C-shaped slot 30.

The lower portion 54 includes a coupling 72 configured to mate with the receiver 16 of the sample manipulator 14. The coupling 72 shown is a frustoconical shaped coupling 72 that can match the concave shaped (cup, bowl) receiver 16. In other embodiments, the coupling 72 can be concave shaped and the sample manipulator 14 can have a receiver 16 with a matching tapered frustoconical shape. The tapered shape of the coupling 72 is configured to more easily mate with the receiver 16 of the sample manipulator 14.

Figure 9:
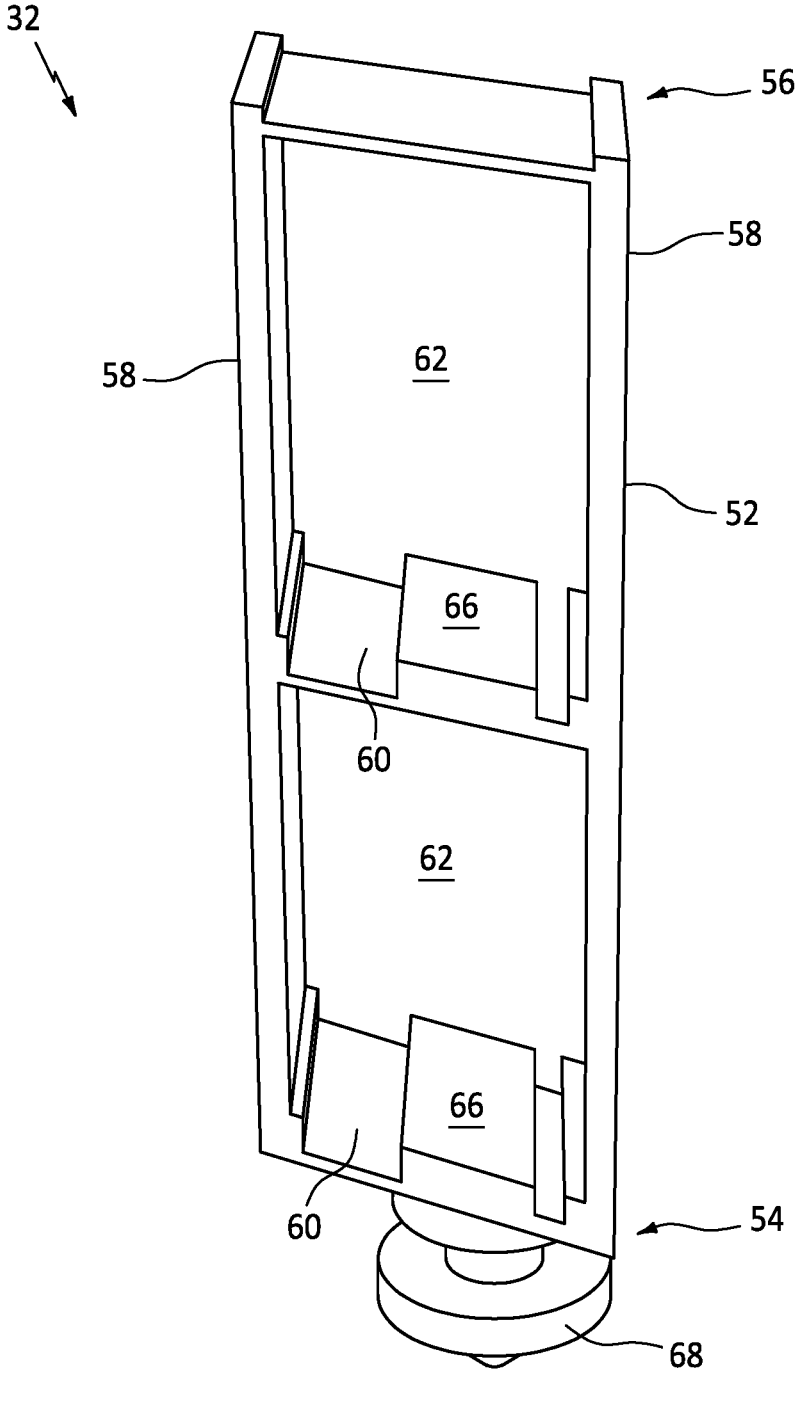
FIG. 9 is a front isometric view schematic representation of an exemplary sample stage.

The exemplary embodiment shown in FIG. 9 illustrates a configuration with chambers 62 that are rectilinear shaped. The mounting feature 66 is shown to be rectilinear shaped. This embodiment demonstrates that the sample chamber 62 can be adapted to house sample parts 64 with a variety of shapes.

Figure 10:
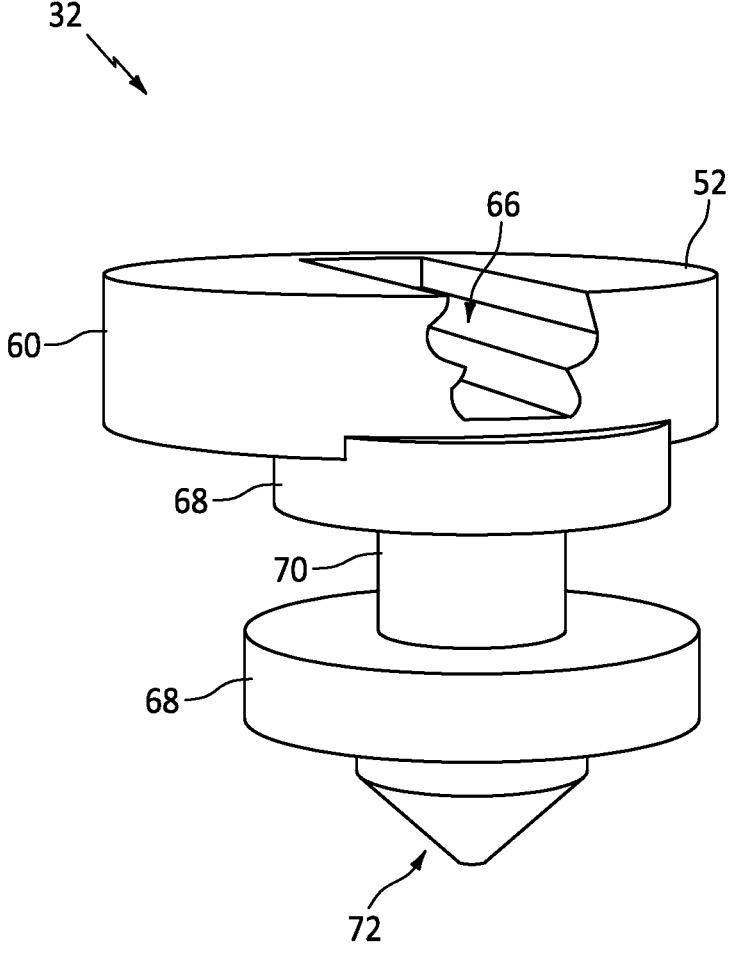
FIG. 10 is a front isometric view schematic representation of an exemplary sample stage lower portion.

In an exemplary embodiment as shown in FIG. 10 the sample stage 32 includes an abbreviated body 52 with a shelf 60 including a mounting feature 66. The mounting feature 66 is shown as an exemplary fir tree shape to receive the root of a blade.

Figure 11:
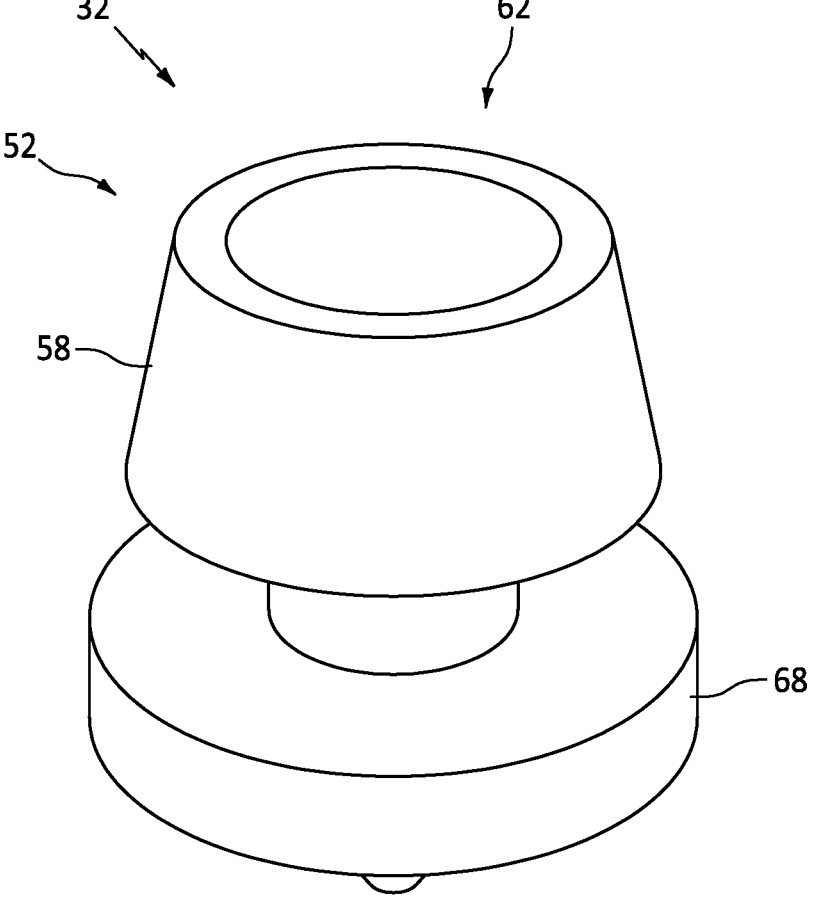
FIG. 11 is an isometric view schematic representation of an exemplary sample stage lower portion.
Figure 12:
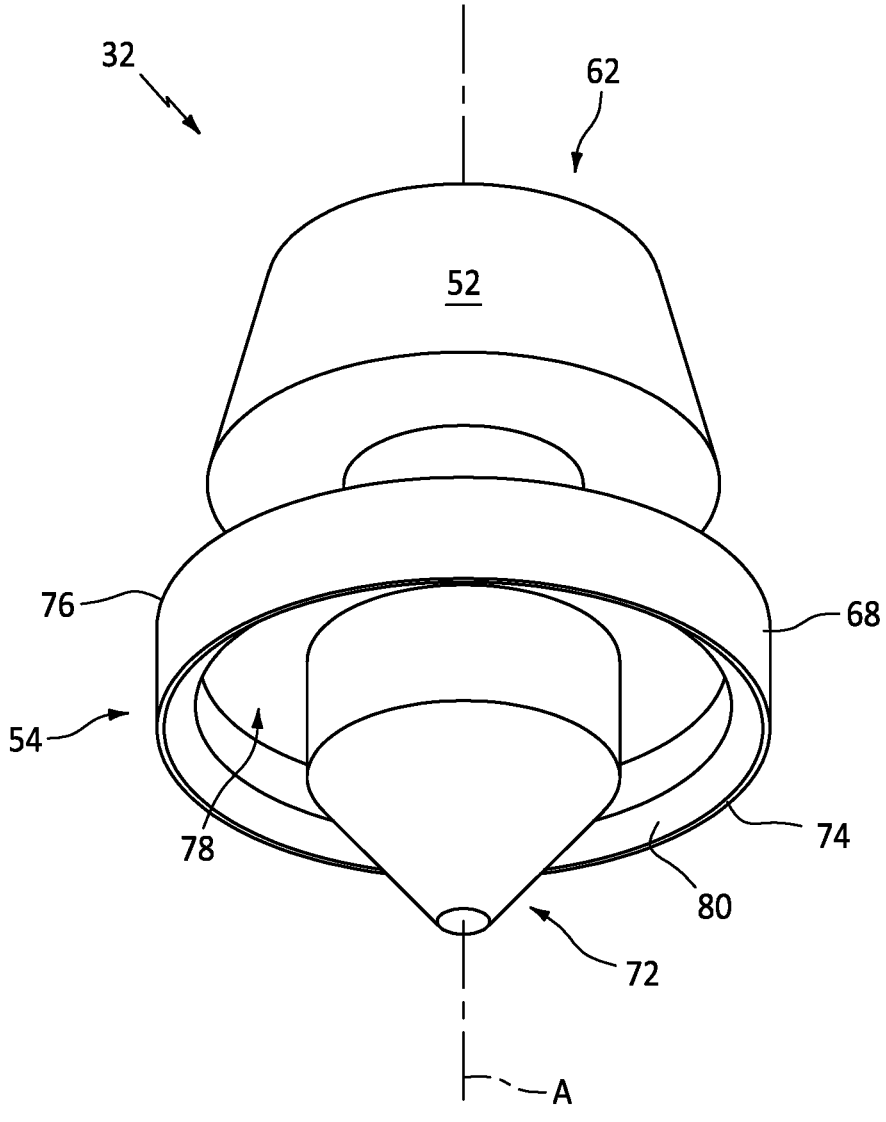
FIG. 12 is a bottom isometric view schematic representation of an exemplary sample stage lower portion.

FIG. 11 and FIG. 12 illustrate an exemplary embodiment with the sample stage 32 and sample chamber 62. The sample stage 32 can include a sample chamber 62 configured as an open container. The chamber 62 shown is cylindrically shaped. The body 52 side wall 58 is tapered with a larger diameter proximate the flange 68 and a smaller diameter distal from the flange 68. The sample stage 32 can be utilized with certain shaped sample part 64. The lower portion 54 includes flange 68 including an additional axial ring 74 extending axially from a radially outermost portion 76 of the flange 68 to form a right circular cavity 78. The cavity 78 can receive a portion of the receiver 16. The axial ring 74 can include a tapered lip 80. The tapered lip 80 can facilitate guiding the receiver 16 into the cavity 78 and mating the sample stage 32 with the receiver 16.

A technical advantage of the disclosed X-ray tomography sample changing hardware disclosed includes the capacity to image a wide breadth of part geometry for use with an X-ray tomography machine.

Another technical advantage of the disclosed X-ray tomography sample changing hardware disclosed includes increased flexibility for imaging multiple types of parts.

Another technical advantage of the disclosed X-ray tomography sample changing hardware disclosed includes optimizing X-ray tomography machines during overnight and weekend working hours.

Another technical advantage of the disclosed X-ray tomography sample changing hardware disclosed includes a sample stage adapted to accept a large variety of physical geometries.

Another technical advantage of the disclosed X-ray tomography sample changing hardware disclosed includes the capacity to vertically stack samples.

There has been provided a X-ray tomography sample changing hardware. While the X-ray tomography sample changing hardware has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An X-ray tomography sample changing hardware comprising:
   a support bracket configured to attach to an X-ray tomography support;
   a mounting arm attached to the support bracket, the mounting arm having a beam, at least one slot formed in the beam, the at least one slot including a mouth configured to receive a sample stage, wherein at least two slots are arrayed along the beam of the mounting arm in a spaced apart fashion configured to allow for space between the sample stages supported on the mounting arm;
   the sample stage including a body having an axis with an upper portion and a lower portion axially opposite the upper portion; the lower portion configured to mate with a receiver on a sample manipulator for an X-ray tomography machine; and
   multiple chambers formed in the body and aligned axially between the upper portion and the lower portion, each of the multiple chambers including a mounting feature configured to support a part within each of the multiple chambers.

2. The X-ray tomography sample changing hardware according to claim 1, wherein the body of the sample stage includes walls formed in the body; the walls supporting shelves defining each of the multiple chambers.

3. The X-ray tomography sample changing hardware according to claim 1, wherein the multiple sample chambers are oriented axially and configured for vertical stacking of each part in the sample stage.

4. The X-ray tomography sample changing hardware according to claim 1, wherein the lower portion of the sample stage includes dual flanges extending radially from a shaft formed in the body proximate the lower portion, the shaft including a diameter sized to be insertable into/removeable from the mouth of the slot, the dual flanges being sized larger than the mouth of the slot, the dual flanges configured to nest in a concave surface of the slot.

5. The X-ray tomography sample changing hardware according to claim 1, wherein the lower portion includes a coupling configured to mate with the receiver of the sample manipulator.

6. The X-ray tomography sample changing hardware according to claim 1, wherein the mounting feature is selected from the group consisting of slots, grooves, notches, hollows, pins, hooks, and latches.

7. An X-ray tomography sample changing hardware comprising:

an X-ray scanner proximate a scanner support;

a sample manipulator in operative communication with the X-ray scanner; the sample manipulator including a receiver mounted on a turntable secured to a sled mounted on a table;

a support bracket configured to attach to the scanner support;

a mounting arm attached to the support bracket, the mounting arm having a beam, at least one slot formed in the beam, the at least one slot including a mouth configured to receive a sample stage, wherein at least two slots are arrayed along the beam of the mounting arm in a spaced apart fashion configured to allow for space between the sample stages supported on the mounting arm;

the sample stage including a body having an axis with an upper portion and a lower portion axially opposite the upper portion; the lower portion configured to mate with the receiver on the sample manipulator; and multiple chambers formed in the body and aligned axially between the upper portion and the lower portion, each of the multiple chambers including a mounting feature configured to support a part within each of the multiple chambers.

8. The X-ray tomography sample changing hardware according to claim 7, wherein the mounting feature is selected from the group consisting of slots, grooves, notches, hollows, pins, hooks, and latches.

9. The X-ray tomography sample changing hardware according to claim 7, wherein the lower portion includes a coupling configured to mate with the receiver of the sample manipulator.

10. The X-ray tomography sample changing hardware according to claim 7, wherein the lower portion of the sample stage includes at least one flange extending radially from a shaft formed in the body proximate the lower portion, the shaft including a diameter sized to be insertable into/ removeable from the mouth of the slot, the at least one flange being sized larger than the mouth of the slot, the at least one flange configured to nest in a concave surface of the slot.

11. The X-ray tomography sample changing hardware according to claim 7, wherein the body of the sample stage includes a wall formed in the body; the wall supporting shelves defining each of the multiple chambers.

12. The X-ray tomography sample changing hardware according to claim 7, wherein the multiple sample chambers are oriented axially and configured for vertical stacking of each part in the sample stage.

13. A process for supporting a part in an X-ray tomography sample changing hardware comprising:

attaching a support bracket an X-ray tomography scanner support;

attaching a mounting arm to the support bracket, the mounting arm having a beam, at least one slot formed in the beam, the at least one slot including a mouth configured to receive a sample stage, wherein at least two slots are arrayed along the beam of the mounting arm in a spaced apart fashion configured to allow for space between the sample stages supported on the mounting arm;

the sample stage including a body having an axis with an upper portion and a lower portion axially opposite the upper portion;

mating the lower portion with a receiver on a sample manipulator for an X-ray tomography machine;

forming multiple chambers in the body; and aligning the multiple chambers axially between the upper portion and the lower portion.

14. The process of claim 13, further comprising:

supporting a part within at least one of the multiple chambers employing a mounting feature.

15. The process of claim 13, wherein the body of the sample stage includes walls formed in the body; and defining each of the multiple chambers by employing shelves formed between the walls.

16. The process of claim 13, further comprising:

orienting the multiple sample chambers axially; and configuring the multiple chambers for vertical stacking of each part in the sample stage.

17. The process of claim 13, further comprising:

forming the mounting feature to accept a variety of part geometries, wherein the mounting feature is selected from the group consisting of slots, grooves, notches, hollows, pins, hooks, and latches.

18. The process of claim 13, further comprising:

extending at least one flange radially from a shaft formed in the body proximate the lower portion, the shaft including a diameter sized to be insertable into/removeable from the mouth of the slot, the at least one flange being sized larger than the mouth of the slot, the at least one flange configured to nest in a concave surface of the slot.

19. The process of claim 18, further comprising:

forming a coupling in the lower portion; the coupling configured to mate with the receiver of the sample manipulator.

* * * * *